Oct. 2, 1945.   E. C. JEFFERS ET AL   2,386,121
JOURNAL LUBRICATING DEVICE
Filed Oct. 16, 1943   2 Sheets-Sheet 2
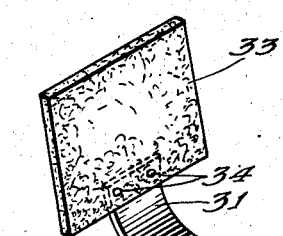
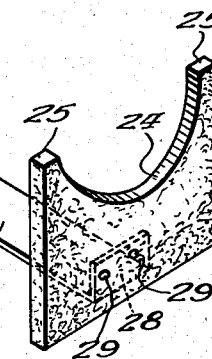
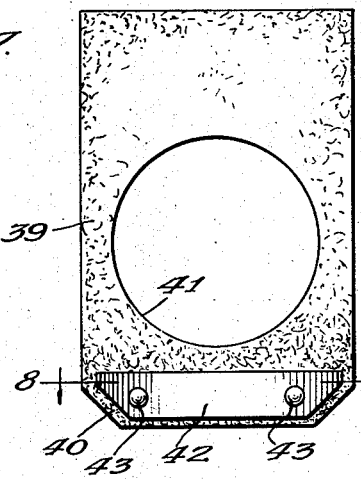
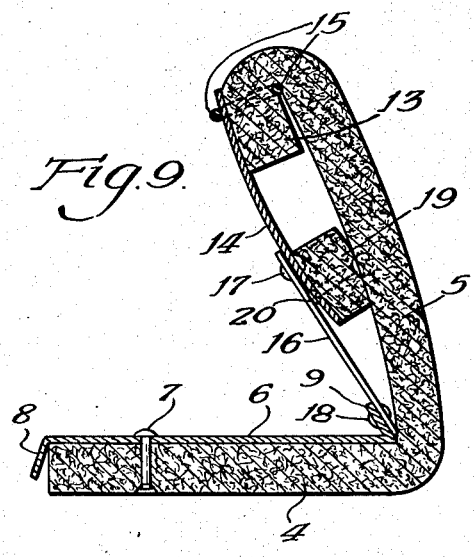
Inventors:
Edward C. Jeffers
Martin C. Jeffers
By Louis A. Bisson,
Attorney Patented Oct. 2, 1945

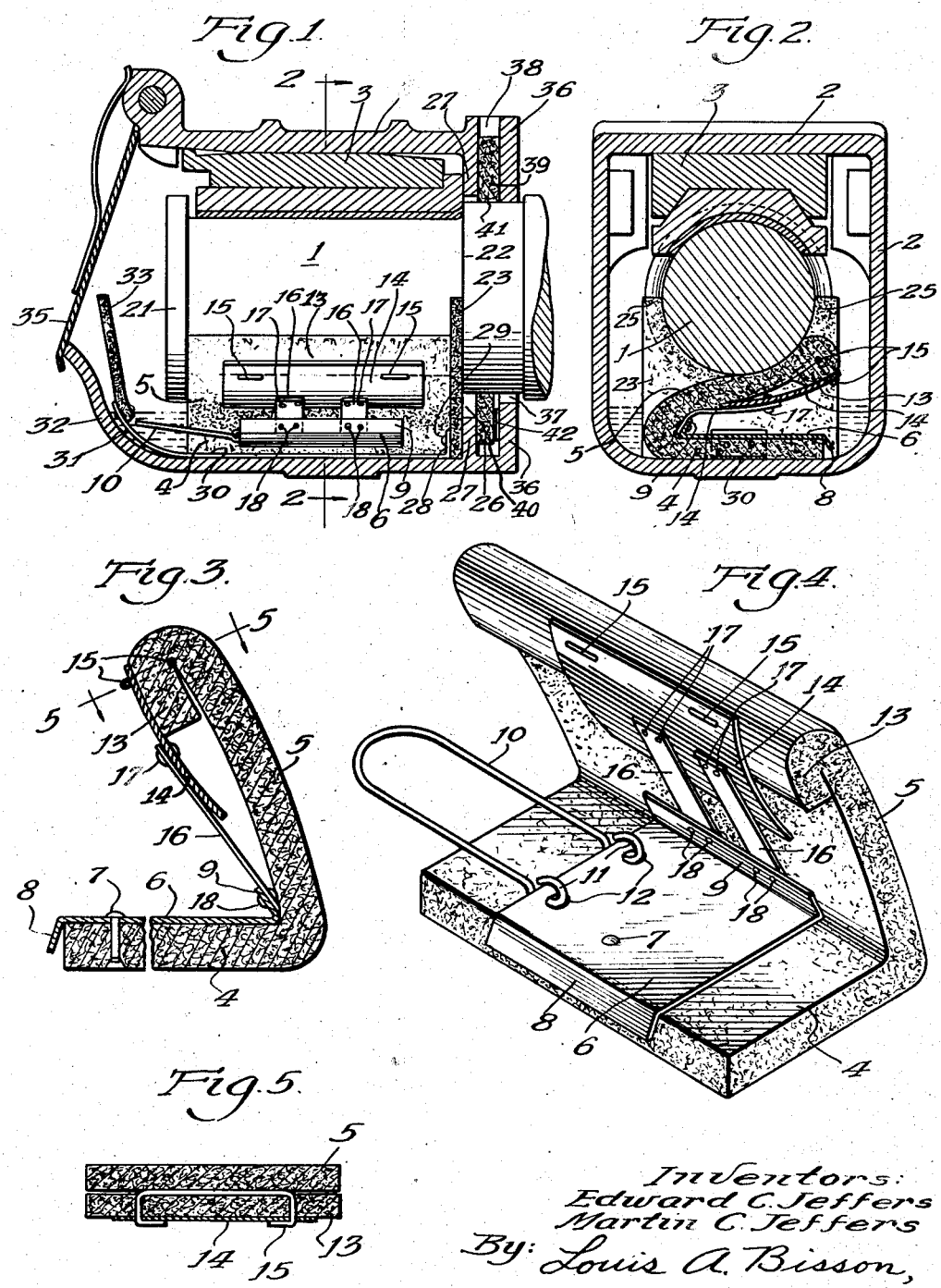

2,386,121

UNITED STATES PATENT OFFICE 2,386,121

JOURNAL LUBRICATING DEVICE

Edward C. Jeffers and Martin C. Jeffers, Chicago, Ill.

Application October 16, 1943, Serial No. 506,478

11 Claims. (Cl. 308—88)

The present invention relates to lubricating devices for journals or axles, such as those of railway vehicles, and the like.

Among the objects of the invention is to provide a novel lubricating device for journals, which is durable and which efficiently lubricates or oils the journal, which will prevent loss of the lubricant from splashing or the like, which will prevent access of dust, dirt or the like to the journal and abrade it, and which is easily located in operative position and as easily removed for any purpose.

In the embodiments selected to illustrate the invention the device comprises a thick sheet of porous material, such as felt, any woven or knitted fabric which is preferably thick, asbestos, matted ductile, non-abrasive metal fibers, and the like, having a base section or segment adapted to repose in the oil or lubricant at the bottom of the journal box, such as the well thereof, and an overlying upwardly extending section or segment for having pressed wiping contact with the axle or journal, forming a dihedral angle between the segments, the segments being connected to pressing elements, such as relatively stiff plates or sheets, of which the plate on the lower segment acts to hold the lower segment in the lower part of the journal box and in the oil or lubricant, and the other plate on the other segment acts to press the latter segment against the axle or journal for constantly supplying the oil or lubricant to the axle or journal and to maintain it effectively and efficiently lubricated. To the plates are connected resilient elements, such as flat springs, for constantly and resiliently pressing the lubricant supplying segment to and against the journal and incidentally away from the base segment on the bottom of the journal box. The span or lap of the lubricant applying segment between its juncture with the base segment and its upper part, which is attached to the pressing plate, is free so as to flex and conform in shape to the circular contour of the journal being supplied with the lubricant from such segment when pressed to the journal by the pressing plate. This provides for a wider area of distribution of the lubricant on the journal. The length of the lubricant applying segment is approximately the length of the bearing part of the journal so as to supply sufficient and ample lubricant to the journal throughout the length of the bearing part thereof.

The invention also comprehends the provision of novel means for eliminating or preventing the loss of lubricant from splashing or surging of the lubricant in the journal box and has a fibrous or similar pad or pads or the like located to intercept the splashed or surging oil or lubricant and to assist in applying lubricant to the journal, as at the inner end of the journal and the supply segment pressing against the journal.

Other objects, advantages, capabilities, features and the like are comprehended by the invention as will later appear and as are inherently possessed by the invention.

Referring briefly to the drawings:

Fig. 1 is a longitudinal sectional view through a journal box embodying the invention;

Fig. 2 is a transverse sectional view of the same taken in a plane represented by line 2—2 in Fig. 1 of the drawings;

Fig. 3 is a transverse sectional view of part of the lubricating device;

Fig. 4 is a perspective view of the same;

Fig. 5 is a sectional view taken in a plane represented by line 5—5 in Fig. 3 of the drawings;

Fig. 6 is a perspective view of part of the device for eliminating loss of lubricant from splashing or the like;

Fig. 7 is a view in elevation of part of the device for preventing access of foreign material to the journal;

Fig. 8 is a transverse sectional view of the same taken in a plane represented by line 8—8 in Fig. 7 of the drawings;

Fig. 9 is a transverse sectional view similar to that shown in Fig. 3 of an alternative form of the device; and Fig. 10 is a part transverse sectional view of the same similar to the view shown in Fig. 2.

Referring more in detail to the drawings, the embodiments selected to illustrate the invention are shown in use with a journal 1 extending into a journal box 2 and bearing against a journal bearing block 3, and as comprehending a thick sheet of porous fibrous material having a lower or base segment 4 and an upper or pressing segment 5, the segments 4 and 5 forming a sort of dihedral angle as shown.

On the base segment 4 is disposed a plate 6 of stiff material, such as metal, connected to the segment 4 by any suitable securing means 7, such as a rivet or the like, and the plate 6 may have at a side thereof a depending flange 8 to give lateral support to the edge of the segment 4, as shown, and the plate 6 has at the other side thereof an upwardly extending flange 9 which is preferably at an angle to the plate 6 of less than 90°. To an end of the plate 6 is connected a bail 10 provided with eyes 11 hooked through holes 12 provided at said end of the plate 6, as shown best in Fig. 4.

The upper part of the segment 5 has a folded or bent back or reflexed portion 13 to act as a spacing pad or the like. To this pad 13 is secured the upper part of a pressing plate 14 by means of any suitable securing element 15, such as a wire clip, as shown. The pressing plate 14 may be curved as shown with its lower edge normally spaced from the segment 5 but adapted to press against the segment 5 as shown in Fig. 2. To an intermediate portion of the plate 14 is fastened an end of one or more resilient members 16, such as steel springs, by any suitable securing elements 17, such as rivets, the lower end of the resilient members 16 being secured to the flange 9, preferably at the outer side thereof, as shown, and by any suitable securing elements 18, such as rivets.

In the form shown in Figs. 9 and 10 the device has an additional pad 19, similar to pad 13, and preferably made of like material, which pad 19 may be connected to the lower portion of the plate 14 by any suitable securing elements 20, such as rivets. This pad 19 is adapted to be pressed against the segment 5, the same as the pad 13, and is spaced from the pad 13 so as to afford a spanning portion or lap of the segment 5 between the pads 13 and 19 which when pressed against the axle 1 will be curved to conform to the curvature or contour of the axle 1, as shown in Fig. 10. The pads 13 and 19 also will act as border members for the segment 5, so that as the segment 5 is pressed to and against the axle the spanning portion of the segment 5 between the pads 13 and 19 will be held and maintained taut against the axle 1. In the form shown in Figs. 1, 2, 3 and 4 the same effect is obtained but to a lesser degree by the lower portion of the plate 14 pressing against the segment 5, as shown in Fig. 2.

The segments 4 and 5 are preferably of substantial width and also of a length approximately that of the length of the axle 1 between the end head 21 of the axle (see Fig. 1) and the shouldered part 22 thereof to afford a large area surface contact for supplying the lubricant at least for the full length of the axle 1. The device of the present invention comprehends the provision of a segment 23 of porous and fibrous material, similar to that of the segments 4 and 5, at the inner end of the segments 4 and 5 and adjacent the shoulder 22 (see Figs. 1, 2 and 6), this segment 23 extending down into the oil well of the journal box 2 and having its upper end provided with an arc shaped portion 24 to fit about the inner end portion of the axle 1 adjacent the shoulder 22, and to provide upwardly extending legs or arms 25 reaching above the normal level of the oil or the lubricant in the well of the journal box 2. The oil will also work its way by capillarity or wick action from the oil well to the arc portion 24 and the legs or arms 25 to feed oil to the axle 1 particularly the filleted portion of the journal, as shown in Fig. 1. This segment 23 also covers the opening 26 (Fig. 1), in the inner wall 27 to prevent the escape of splashed oil.

The lower end of the segment 23 is connected to an end flange 28, as by rivets 29, of a base strip 30 lying on the bottom of the journal box 2 and under the segment 4, and extending toward the outer end portion of the journal box 2 (see Fig. 1) where it has a curved upper end portion 31 to lie adjacent to and upon the lower curved outer end wall 32 of the well part of the journal box 2, as shown in Fig. 1. The bail 10, as shown in Fig. 1, will normally be disposed over the outer portion of the base strip 30. At the upwardly extending end portion 31 is fastened a segment or pad 33 of porous fibrous material, such as that of the segments 4 and 5, by any suitable fastening elements 34, such as rivets, as shown best in Fig. 6. This pad or segment 33 extends down normally into the oil in the oil well and up materially above the normal level of the oil, and for the full width of the outer end portion of the journal box 2, substantially as shown in Fig. 1, so as to prevent escape of oil when splashed or the like. The opening at the outer end of the journal box is normally closed by a door 35 (Fig. 1) according to usual practice.

At the inner end of the journal box 2 is a second wall 36 provided with an opening 37 for the extension therethrough of the shoulder portion of the axle 1 and being spaced from the wall 27 to provide therebetween a vertical chamber 38. Disposed vertically in this chamber is a further segment 39 of porous fibrous material, such as that of segments 4 and 5, having its lower end 40 extending down into the lower end of the chamber 38, and being provided with an opening 41 for receiving the shouldered portion of the shaft or axle 1. At the lower end of the segment 39 is attached a resilient piece or strip 42 such as a steel spring (see Figs. 7 and 8) by any suitable securing elements 43, such as rivets, the strip 42 being normally bowed to react against the wall 36 to constantly press the segment 39 against the wall 27 to maintain it closed or sealed from entry of dust, dirt and the like. The segment 39 because of the nature of its material will also carry up oil by capillary action to the shouldered portion of the axle 1 and thus assist in spreading the oil so that it will crawl over to the axle part 1. Any dirt or dust or the like that might find its way through the opening 37 will be held back by the segment 39 and prevented from having access to the axle 1.

In use the device is located in the well of the journal box 2 beneath the axle 1, as shown in Fig. 1, with the segment 4 on the bottom of the journal box 2, that is in the well, and over the strip 30. To insert the device the segment 5 is pressed down against the resilience of the spring 16, substantially parallel to the base segment 4 and then inserted in place under the axle 1 and over the strip 30, after this strip 30 has been located in place on the bottom of the journal box 2 with the segment 23 against the shoulder 22 and spanning the inner end of the axle 1. The segment 5 is then permitted to expand by the force of the spring 16 to be pressed up against the axle 1, as shown in particular in Figs. 2 and 10. The spring 16 will so press up against the plate 14 as to cause the latter to press at its upper portion against the reflexed part 13 of the segment 5 and at its lower portion either directly (Fig. 4) against the segment 5 or by way of (Fig. 10) the segment or pad 19 against the segment 5, so as to press the intervening portion of the segment 5, in taut condition, against the axle 1 and in conformity with its curvature. To remove the device a converse operation is followed. The bail 10 is useful for withdrawing the device as will be apparent. The lubricant will be fed by capillary attraction or wick action by way of the segments to the axle to supply the lubricant over an extended area and for substantially the full length of the axle. The spring 16 will constantly press the segment 5 against the axle. The inner end of the segment 5 will hold the segment 23 against the shoulder 22. The spring 42 will hold the segment 39 against the wall 27. The segment 23 will prevent escape of the lubricant when it splashes or surges from the lurching or like movements of the journal box 2.

While we have herein described and upon the drawings shown a few illustrative embodiments of the invention it is to be understood that the invention is not limited thereto but comprehends other constructions, details, arrangements of parts, features, and the like, without departing from the spirit of the invention.

Having thus disclosed the invention, we claim:

1. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, a pressure plate connected to said pressing segment, a resilient member connected to said pressure plate, and reacting against said base segment to press said pressing segment against the journal.

2. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, a base plate on said base segment, a pressure plate connected to said pressing segment, a resilient member connected to said plates for pressing said pressing segment against the journal.

3. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, the upper part of said pressing segment having a pad of porous fibrous material, a pressure plate connected to said pad and extending downwardly opposite the lower portion of said segment, a resilient member connected to said pressure plate and reacting against said base segment to press said pressing segment against the journal.

4. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, the upper part of said pressing segment having a pad of porous fibrous material, a pressure plate connected to said pad and extending downwardly opposite the lower portion of said segment, a base plate on said base segment, a resilient member connected to said plates for pressing said pressing segment against the journal.

5. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, the upper part of said pressing segment having a pad of porous fibrous material, a pressure plate connected to said pad, a second pad of porous fibrous material at the lower portion of said pressure plate and located to press against said pressing segment in spaced relation to said first pad, a resilient member connected to said pressure plate, and reacting against said base segment to press said pressing segment against the journal.

6. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, the upper part of said pressing segment having a pad of porous fibrous material, a pressure plate connected to said pad, a second pad of porous fibrous material at the lower portion of said pressure plate located to press against said pressing segment in spaced relation to said first pad, a base plate on said base segment, a resilient member connected to said plates for pressing said pressing segment against the journal.

7. A lubricating device for a journal extending through an end wall of and into a journal box having a well below the journal for holding a lubricant, comprising a sheet of porous fibrous material having a base segment for location in the well and an upwardly extending segment for pressing against the journal and being disposed at an acute angle to the base segment, a pressure plate connected to said pressing segment, a base plate on said base segment and having an upwardly extending flange, a resilient member connected to said pressure plate and to said flange for pressing said pressing segment against the journal.

8. In a lubricating device for a journal extending through an end wall of and into a journal box having a well below the journal for holding a lubricant, comprising a sheet of porous material having a base segment for location in the well and an upwardly extending segment for pressing against the journal and being disposed at an acute angle to the base segment, the upper part of said pressing segment having a pad of porous material, an intermediate part of said pressing segment having a pad of porous material in spaced relation to said first mentioned pad, a pressure plate connected to said pads, a resilient member connected to said presser plate and reacting against said base segment to press said pressing segment against the journal.

9. In a lubricating device for a journal extending through an end wall of and into a journal box having a well below the journal for holding a lubricant, comprising a sheet of porous material having a base segment for location in the well and an upwardly extending segment for pressing against the journal and being disposed at an acute angle to the base segment, the upper part of said pressing segment having a pad of porous material, an intermediate part of said pressing segment having a pad of porous material in spaced relation to said first mentioned pad, a pressure plate connected to said pads, a base plate on said base segment, a resilient member connected to said plates for pressing said pressing segment against the journal.

10. In a lubricating device for a journal extending through an end wall of and into a journal box having a well below the journal for holding a lubricant, comprising a sheet of porous material having a base segment for location in the well and an upwardly extending segment for pressing against the journal and being disposed at an acute angle to the base segment, a pressure plate connected at its upper part to the upper part of said pressing segment and extending downwardly opposite a lower portion of the pressing segment, a resilient member connected to said pressure plate and extending down to and reacting against said base segment to press said pressing segment against the journal.

11. In a lubricating device for a journal extending through an end wall of and into a journal box having a well below the journal for holding a lubricant, comprising a sheet of porous material having a base segment for location in the well and an upwardly extending segment for pressing against the journal and being disposed at an acute angle to the base segment, a pressure plate connected at its upper part to the upper part of said pressing segment and extending downwardly opposite a lower portion of the pressing segment, a resilient member connected to said pressure plate and extending down to and reacting against said base segment to press said pressing segment against the journal, a base plate on said base segment, a resilient member connected to said plates for pressing said pressing segment against the journal.

EDWARD C. JEFFERS.
MARTIN C. JEFFERS.